United States Patent
Bellinger

[11] Patent Number: 6,030,315
[45] Date of Patent: Feb. 29, 2000

[54] SYSTEM FOR OVERRIDING HOLD MODE OPERATION OF AN AUTOMATED TRANSMISSION

[75] Inventor: Steven M. Bellinger, Columbus, Ind.

[73] Assignee: Cumiins Engine Company, Inc., Columbus, Ohio

[21] Appl. No.: 09/181,019

[22] Filed: Oct. 27, 1998

[51] Int. Cl.[7] .................................................. B60K 41/06
[52] U.S. Cl. ........................ 477/121; 477/111; 477/115; 477/142; 74/336 R
[58] Field of Search ................................ 477/111, 115, 477/121, 134, 137, 142; 701/52, 54; 74/336 R

[56] References Cited

U.S. PATENT DOCUMENTS

| | | | |
|---|---|---|---|
| 5,050,456 | 9/1991 | Fukuda | 477/115 |
| 5,089,965 | 2/1992 | Braun | 701/52 |
| 5,166,879 | 11/1992 | Greene et al. | 701/62 |
| 5,224,398 | 7/1993 | Sasaki | 475/123 |
| 5,272,939 | 12/1993 | Markyvech et al. | 477/120 |
| 5,335,566 | 8/1994 | Genise et al. | 477/124 |
| 5,410,476 | 4/1995 | Iizuka | 701/56 |
| 5,420,565 | 5/1995 | Holbrook | 340/456 |
| 5,436,834 | 7/1995 | Graf et al. | 701/55 |
| 5,487,004 | 1/1996 | Amsallen | 701/51 |
| 5,545,108 | 8/1996 | Wagner et al. | 477/134 X |
| 5,564,999 | 10/1996 | Bellinger et al. | 477/111 |
| 5,592,851 | 1/1997 | Bates et al. | 74/336 R |
| 5,598,334 | 1/1997 | Shin et al. | 701/51 |
| 5,636,119 | 6/1997 | Coutant et al. | 701/51 |
| 5,636,120 | 6/1997 | Yesel et al. | 701/51 |
| 5,673,592 | 10/1997 | Huggins et al. | 74/336 R |
| 5,680,307 | 10/1997 | Issa et al. | 701/52 |
| 5,766,111 | 6/1998 | Steeby et al. | 477/124 |

Primary Examiner—Sherry L. Estremsky
Attorney, Agent, or Firm—Baker & Daniels

[57] ABSTRACT

A system for overriding hold mode operation of an automated transmission coupled to an internal combustion engine is provided, wherein the transmission is operable in the hold mode of operation to maintain engagement of a currently engaged transmission gear. A control computer is operable to monitor at least one vehicle operating parameter and determine whether hold mode operation is inappropriate based thereon. If hold mode operation is inappropriate, the control computer is operable to either initiate an automatic upshift to a numerically higher transmission gear or limit engine or vehicle speed to a predefined speed value. In this manner, the system of the present invention is operable to allow hold mode operation only when a legitimate need therefore exists.

45 Claims, 5 Drawing Sheets

SYSTEM FOR OVERRIDING HOLD MODE OPERATION OF AN AUTOMATED TRANSMISSION

FIELD OF THE INVENTION

The present invention relates generally to systems for controlling operation of an internal combustion engine and/or an automated transmission coupled thereto, and more specifically to such systems operable to control the engine and/or transmission during a "hold mode" transmission operating condition wherein the currently engaged gear is maintained and wherein the vehicle operator may initiate manual upshifts and downshifts.

BACKGROUND OF THE INVENTION

Many modern automated transmissions used in medium and heavy duty truck applications include a so-called "hold mode" feature that allows the vehicle operator to effectively lock the automated transmission in any desired gear, and which may further include the capability to permit manual upshifts and downshifts during hold mode operation. The hold mode feature is intended, at least in part, to provide added flexibility and driver control of the vehicle under low road speed and high engine load conditions by allowing the driver to override transmission shift point logic. Examples of vehicle operating conditions wherein such hold mode operation is beneficial include, but are not limited to, maneuvering away from loading docks, traversing intersections, climbing positive grades, operating in extreme terrains, and the like.

While the hold mode feature of many automated transmissions have been generally well received and widely implemented in the trucking industry, this feature has several drawbacks associated therewith. For example, the hold mode feature allows the vehicle operator to select hold mode operation at will and resultantly disable automated shift point control logic as desired. Under certain vehicle operating conditions, such as low engine load conditions, vehicle operation at a numerically lower gear than would otherwise be selected by the shift point control logic results in unnecessarily high engine rpm operation and degraded fuel economy. In vehicles having manual transmissions, a so-called "geardown protection" feature may be implemented to limit vehicle speed when the vehicle operator has not selected the numerically highest transmission gear, thereby encouraging efficient shifting. An example of one such geardown protection feature is described in U.S. Pat. No. 5,564,999 to Bellinger et al., which is assigned to the assignee of the present invention. At present, however, no systems are known which provide a hold mode override feature that effectively discourages hold mode operation when a legitimate need therefore does not exist.

What is therefore needed is a system for overriding the hold mode feature of an automated transmission during vehicle/engine operating conditions where hold mode operation is undesirable, thereby encouraging or forcing more efficient engine and vehicle operation.

SUMMARY OF THE INVENTION

The foregoing shortcomings of the prior art are addressed by the present invention. In accordance with one aspect of the present invention, a system for overriding hold mode operation of an automated transmission comprises an automated transmission coupled to an internal combustion engine, the transmission having a selectable hold mode of operation maintaining engagement of a currently engaged transmission gear, means for determining at least one vehicle operating parameter and producing a vehicle operating parameter signal corresponding thereto, and a control computer responsive to the vehicle operating parameter signal when the hold mode of operation is selected to determine whether the hold mode of operation is inappropriate, and wherein the control computer is operable to perform one of initiating an automatic upshift to a numerically higher transmission gear and limiting one of engine and vehicle speed to a predefined speed value if the hold mode of operation is inappropriate.

In accordance with another aspect of the present invention, a method of overriding hold mode operation of an automated transmission coupled to an internal combustion engine wherein the automated transmission has a hold mode of operation maintaining engagement of a currently engaged gear ratio, comprises the steps of determining whether the hold mode of operation is selected, determining at least one vehicle operating parameter, determining whether the hold mode of operation is appropriate if the hold mode of operation is selected based on the at least one vehicle operating parameter, and performing one of initiating an automatic upshift to a numerically higher transmission gear and limiting one engine and vehicle speed to a predefined speed value if the hold mode of operation is inappropriate.

One object of the present invention is to provide a system for overriding hold mode operation of an automated transmission when such hold mode of operation is inappropriate.

Another object of the present invention is to provide such a system wherein a determination of whether the hold mode of operation is inappropriate is based on at least one vehicle operating parameter, which may include engine load and engine or vehicle speed.

Yet another object of the present invention is to provide such a system wherein an automatic upshift to a numerically higher transmission gear is initiated or either engine or vehicle speed is limited if hold mode operation is determined to be inappropriate based on the at least one vehicle operating parameter.

These and other objects of the present invention will become more apparent from the following description of the preferred embodiment.

Figure 1:
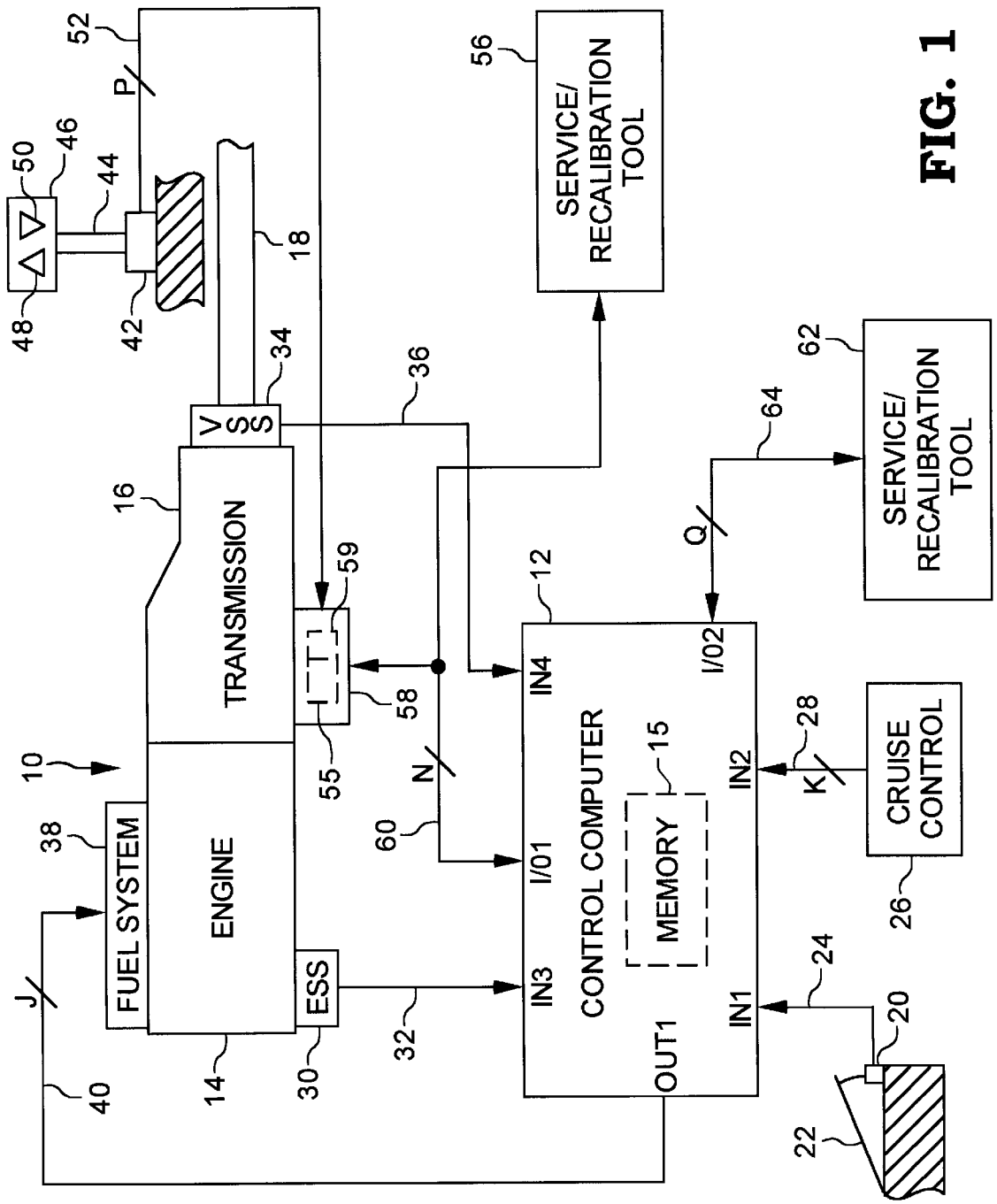
FIG. 1 is a diagrammatic illustration of a system for overriding hold mode operation of an automated transmission, in accordance with the present invention.

1, for overriding hold mode operation, in accordance with the present invention.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a system 10 for overriding hold mode operation of an automated transmission 16, in accordance with the present invention, is shown. System 10 includes a control computer 12 that is preferably microprocessor-based and includes a memory portion 15. In one embodiment, control computer 12 is operable to control and manage operation of an internal combustion engine 14, and may accordingly be an engine control module (ECM), engine control unit (ECU), powertrain control module (PCM) or other known engine control computer. The memory portion 15 of control computer 12 may include ROM, RAM, EPROM, EEPROM, Flash memory and/or any other suitable memory known to those skilled in the art.

Internal combustion engine 14 is operatively coupled to a known automated transmission 16 having a number of automatically selectable gear ratios which is, in turn, coupled to a propeller shaft or tailshaft 18 as is known in the art. Transmission 16 may be a fully automatic transmission; e.g., a powershift transmission or a hydro-mechanical transmission, having a plurality of automatically selectable gear ratios or an automated manual transmission having a number of manually selectable gear ratios and a number of automatically selectable gear ratios, and in either case transmission 16 will be hereinafter referred to as an automated transmission. In one embodiment, transmission 16 is a fully automatic transmission that is commercially available through Eaton Corporation of Cleveland, Ohio. It will be understood, however, that the present invention contemplates other embodiments of an automated manual or fully automatic transmission 16.

A number of sensors and subsystems permit control computer 12 to interface with some of the various components of system 10 as well as other vehicle and engine control systems. Accordingly, control computer includes a number of inputs, outputs and input/output (I/O) ports for interfacing with the various sensors and subsystems. For example, an accelerator pedal position sensor 20 is connected to an input IN1 of control computer 12 via signal path 24, and produces an accelerator pedal signal indicative of the position or percentage deflection of accelerator pedal 22. Sensor 20 may be any known sensor operable to sense accelerator pedal position, percentage, pressure and/or the like, and in one embodiment, sensor 20 includes a potentiometer having a suitable voltage established there across, and wherein the wiper of the potentiometer is mechanically coupled to pedal 22 and electrically connected to signal path 24. Accordingly, the analog voltage on the potentiometer wiper (and consequently on signal path 24) is indicative of the position or percentage deflection of accelerator pedal 22 at any given instant of time. Input IN1 of control computer 12 thus preferably includes an analog-to-digital (A/D) converter operable to convert the analog accelerator pedal signal to a digital quantity suitable for use by control computer 12. It is to be understood, however, that the present invention contemplates that sensor 20 may be operable to produce a digital signal indicative of accelerator pedal position or percentage, in which case input IN1 need not include an A/D converter.

Input IN2 of control computer 12 is connected to a known cruise control unit 26 via a number, K, of signal paths 28 wherein K may be any integer. In operation, control computer 12 receives via signal paths 28 known cruise control request signals, such as on/off, set/cruise, resume/accel, etc., and processes such signals according to a cruise control software algorithm as is known in the art.

Input IN3 of control computer 12 is connected to an engine speed sensor 30 via signal path 32, wherein sensor 30 is operable to sense engine rotational speed (e.g. RPM) and produce an engine speed signal corresponding thereto. In one preferred embodiment, engine speed sensor 30 is a Hall effect sensor operable to sense passage thereby of teeth forming part of a tone wheel or other rotating member and produce an analog signal indicative of engine rotational speed. Input IN3 of control computer accordingly preferably includes an analog-to-digital (A/D) converter operable to convert the analog engine speed signal to a digital signal suitable for processing by control computer 12. Alternatively, engine speed sensor 30 may be any other known sensor or sensing system operable to determine engine rotational speed and produce an analog or digital signal corresponding thereto. An example of one such alternative sensor includes, but is not limited to, a variable reluctance sensor.

Input IN4 of control computer 12 is connected to a vehicle speed sensor 34 via signal path 36. Vehicle speed sensor 34 is operable to sense vehicle speed and produce a vehicle speed signal corresponding thereto on signal path 36. In one preferred embodiment, vehicle speed sensor 34 is a variable reluctance sensor positioned about propeller shaft, or tailshaft, 18 adjacent to transmission 16, and is operable to produce an analog vehicle speed signal corresponding to rotational speed of tailshaft 18. Accordingly, input IN4 of control computer 12 preferably includes an analog-to-digital (A/D) converter operable to convert the analog vehicle speed signal to a digital signal suitable for processing by control computer 12. Alternatively, vehicle speed sensor 34 may be any other known sensor or sensing system positioned at any suitable location as long as such an alternate sensor is operable to produce an analog or digital signal indicative of vehicle speed.

Output OUT1 of control computer 12 is connected to a known fuel system 38 associated with engine 14 via a number, J, of signal paths 40 wherein J may be any integer. As is known in the art, control computer 12 is responsive to the accelerator pedal signal on signal path 24 and/or cruise control signal on signal path 28, as well as other engine/vehicle operating signals, to determine fueling commands and provide corresponding fueling signals to fuel system 38 via signal path 40. Control computer 12 is accordingly operable to control engine output torque, and consequently engine speed, via appropriate fueling commands.

System 10 includes a gear shifting console 42 having a gear shift lever 44 extending therefrom and a gear shift handset 46 affixed thereto. As previously described herein, transmission 16 may be a fully automatic transmission or an automated manual transmission, and in either case gear shift handset 46 preferably includes an upshift selector 48 and a downshift selector 50. Upshift and downshift selectors 48 and 50 respectively are preferably depressable buttons that provide for manually upshifting or downshifting of the automatically selectable transmission gears under certain operating conditions as will be described in greater detail hereinafter. Alternatively, gear shift lever 44 and gear shift handset 46 may be replaced by a series of gear selectors, such as depressable buttons for example, for providing an operator interface to transmission 16. In this alternative embodiment, upshift and downshift selectors 48 and 50 are disposed in any suitable location that is easily accessible to the vehicle operator, such as in the console 42 or instrument panel of the vehicle, for example. In any case, gear shifting console 42 is connected to a transmission control module 58 via a number P of signal paths 52, wherein P may be any integer. At least the status or position of the gear shift lever 44 or equivalent structure/device and the states of upshift selector 48 and downshift selector 50 may accordingly be provided to module 58 via signal path 52.

Transmission control module 58 includes an transmission control computer 55 that further includes, or has access to, a memory unit 59, wherein computer 55 is operable to control and manage the overall operation of transmission 16 via one or more software algorithms and related information stored within memory unit 59. Computer 55 is connected to signal path 52 extending from console 42 and to an input/output port I/O1 of control computer 12 via a number P of signal paths 60, wherein P may be any integer. Signal path 60 is preferably a multi-wire data communications path such as an SAE J1939 datalink, although the present invention contemplates that signal path 60 may alternatively be any other suitable signal path for transmitting information between computer 55 and control computer 12. Much of the engine/vehicle operational data available to control computer 12 is thus available to transmission module 58, and transmission operational data available to control computer 55 is likewise available to control computer 12, via datalink 60. In operation, transmission control computer 55 is responsive to operator initiated signals on signal path 52 as well as certain engine/vehicle operational data broadcast on signal path 60, to control automatic shifting of transmission 16 as is known in the art.

A known service/recalibration tool 56 is connectable to control computer 55 of transmission control module via signal path 60 which, as described hereinabove, is preferably an SAE J1939 data link. Alternatively, the present invention contemplates providing for other modes of communication between service/recalibration tool 56 or similar data collection/transfer device and control computer 55. Service/recalibration tool 56 or similar data collection/transfer device 56 is operable to interface with control computer 55 via signal path 60 to thereby extract operational data therefrom as well as provide programming and calibration data thereto as is known in the art.

Control computer 12 further includes an input/output port I/02 that is connectable to another known service/recalibration tool 62 via a number Q of signal paths 64, wherein Q may be any integer. Preferably, signal path 64 is a known SAE J1587 data link, although the present invention contemplates that signal path 64 may be any other signal path suitable for communication between tool 62 and control computer 12. Alternatively, the present invention contemplates providing for other modes of communication between service/recalibration tool 62 or similar data collection/transfer device and control computer 12. Service/recalibration tool 62 or similar data collection/transfer device is operable to interface with control computer 12 via signal path 64 to thereby extract operational data therefrom as well as provide programming data thereto as is known in the art.

Figure 2:
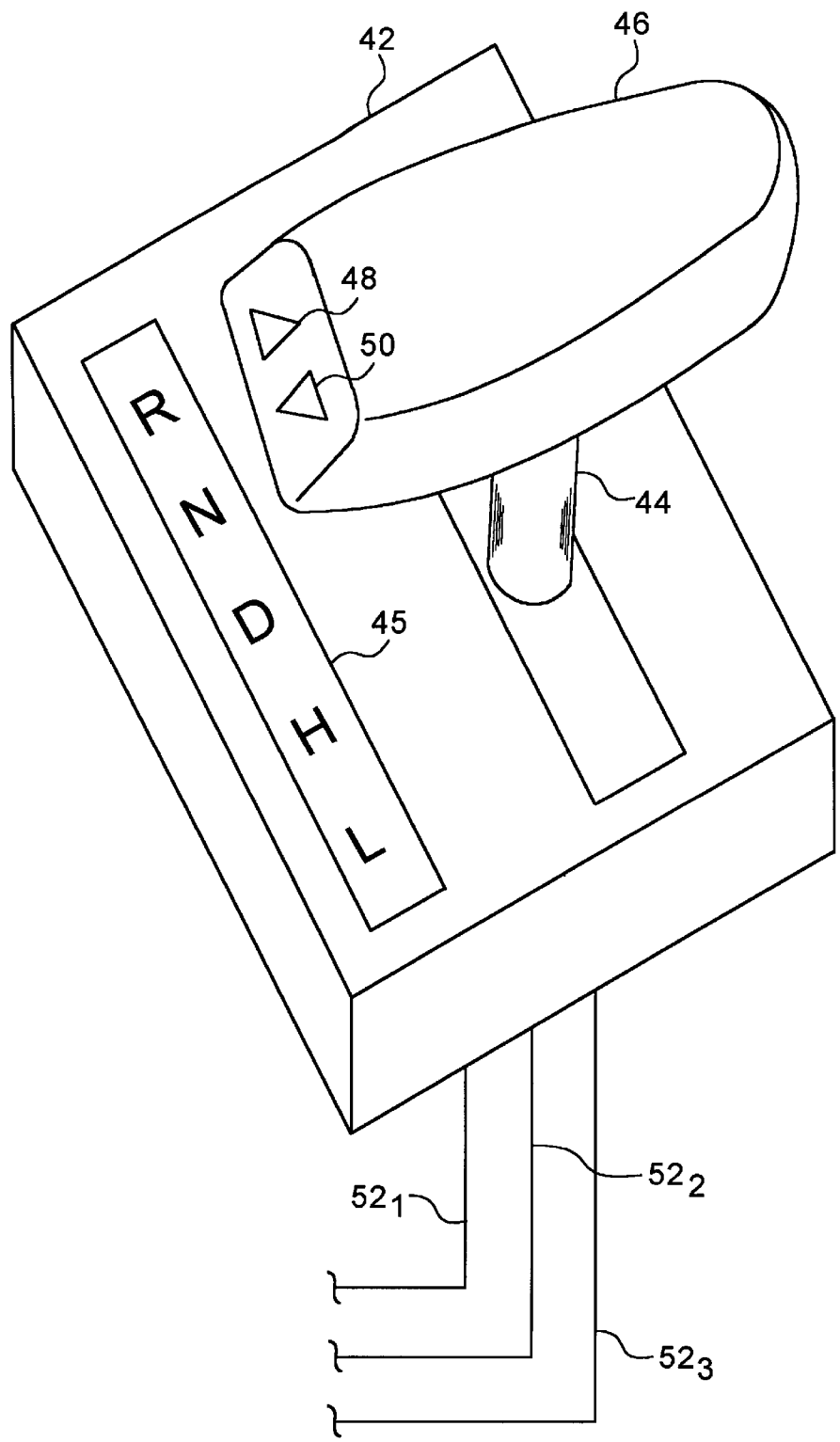
FIG. 2 is a diagrammatic illustration of a known gear selection unit for use with an automated transmission.

Referring now to FIG. 2, one preferred embodiment of the shifting console 42 of FIG. 1 is illustrated for an embodiment of system 10 wherein transmission 16 is a fully automatic transmission. Console 42 is a known console and includes gear shift lever 44 extending therefrom which has gear shift handset 46 affixed thereto. The position of gear shift lever 44 is visible to the vehicle operator via a shift indicator 45. Shift indicator 45 includes R, N, D, H, and L positions corresponding to the known "reverse", "neutral", "drive", "hold" and "low" operational modes of transmission 16, and may further include other indicators of known operational conditions such as "P" (park), "1" or "L1" (1st low gear), "2" or "L2" (second low gear), etc. When gear shift lever 44 is in the R position, transmission 16 is operable to engage a reverse gear ratio thereof, and in the D and L positions, transmission 16 is operable to engage forward gear ratios thereof, while the N position corresponds to a neutral state, or no gear selected, as is known in the art. The H position may be selected while operating in the D position to force the transmission 16 to maintain the currently engaged automatic gear ratio, regardless of engine speed, as is known in the art. In the hold mode of operation, transmission module 58 is thus operable to ignore predefined engine speed shift point logic stored therein to thereby maintain engagement of the currently engaged gear ratio. While in the hold mode of operation, the vehicle operator may control gear shifting via upshift selector 48 and downshift selector 50. The vehicle operator may thus select manual upshifting and downshifting while gear shift lever is in the H position to thereby "bump up" to a numerically higher gear or "bump down" to a numerically lower gear, as is known in the art. In the embodiment illustrated in FIG. 2, signal path 52 preferably includes at least three signal paths $52_1$, $52_2$ and $52_3$ wherein path $52_1$ provides the status or position of gear shift lever 44, path $52_2$ provides the status of upshift selector 48 and path $52_3$ provides the status of downshift selector 59. It is to be understood, however, that signal path 52 may includes more or less signal lines and those skilled in the art will recognize alternative techniques for providing control computer 12 with the foregoing information. Alternatively, console may include other known arrangements for providing operational mode information and manual shifting capabilities. For example, lever 44 and handset 46 may be replaced with a number of selectors, such as push buttons, wherein a vehicle operator may select the various operational modes via appropriate actuation of the various selectors. As another example, console 42 may omit the H operational mode as a selectable transmission operational mode and provide for a number of manual gear selectors each corresponding to different ones of the automatically selectable transmission gears. In this embodiment, hold mode operation is still available even though console 42 does not include an H selection, wherein the vehicle operator may select hold mode operation in a desired gear by actuating an appropriate one of the manual gear selectors while in D (drive) mode. In any case, it is to be understood that console 42 may be variously configured and may or may not include an H selection, although console 42 must, in accordance with the present invention, include a mechanism for allowing the driver to select a "hold" mode of operation wherein the transmission is operable to maintain engagement of a single one of the automatically selectable transmission gears and wherein the operator is further provided with a mechanism for manually upshifting and downshifting from the currently held gear.

Figure 3:
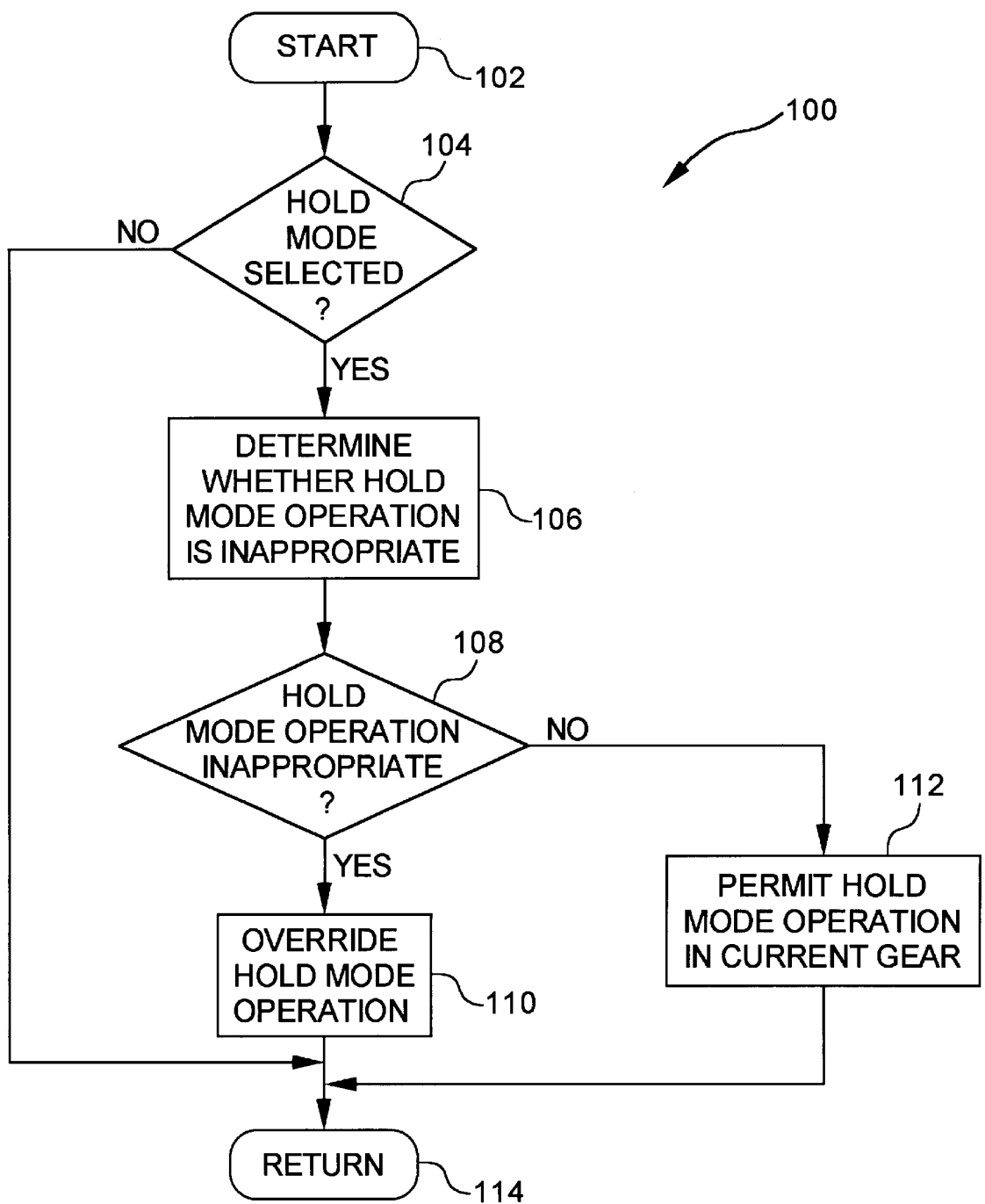
FIG. 3 is a flowchart illustrating one embodiment of a software algorithm, executable by the system of FIG. 1, for overriding the hold mode feature of the automated transmission, in accordance with the present invention.

Referring now to FIG. 3, a flowchart illustrating one preferred embodiment of a software algorithm 100 for overriding the hold mode operation of transmission 16, is shown. Preferably, algorithm 100 is stored in memory 59 and executed by control computer 55 of transmission control module 58, although the present invention contemplates that algorithm 100 may alternatively be executed by another computer in communication with control computer 55, such as control computer 12 wherein the algorithm may be stored within memory 15 and wherein all operational information and commands necessary to execute algorithm 100 is shared between control computer 12 and control computer 55 via signal path 60. Algorithm 100 will be described hereinafter as executed by control computer 55, although it will be understood that the following discussion is applicable to any auxiliary computer operable to execute algorithm 100. In any event, algorithm 100 starts at step 102 and at step 104 control computer 55 determines whether hold mode operation is currently selected. In one embodiment, control computer 55 is operable to make this determination by monitoring signal path 52 for the status of the gear shift lever 44, similar structure/device and/or one or more other structures/devices having similar function as described hereinabove. If, at step 104, control computer 55 determines that the hold mode of operation is not currently selected, algorithm execution continues at step 114 where algorithm 100 is returned to its calling routine. Alternatively, the NO branch of step 104 may loop back to step 104 for continuous operation of algorithm 100.

Figure 4:
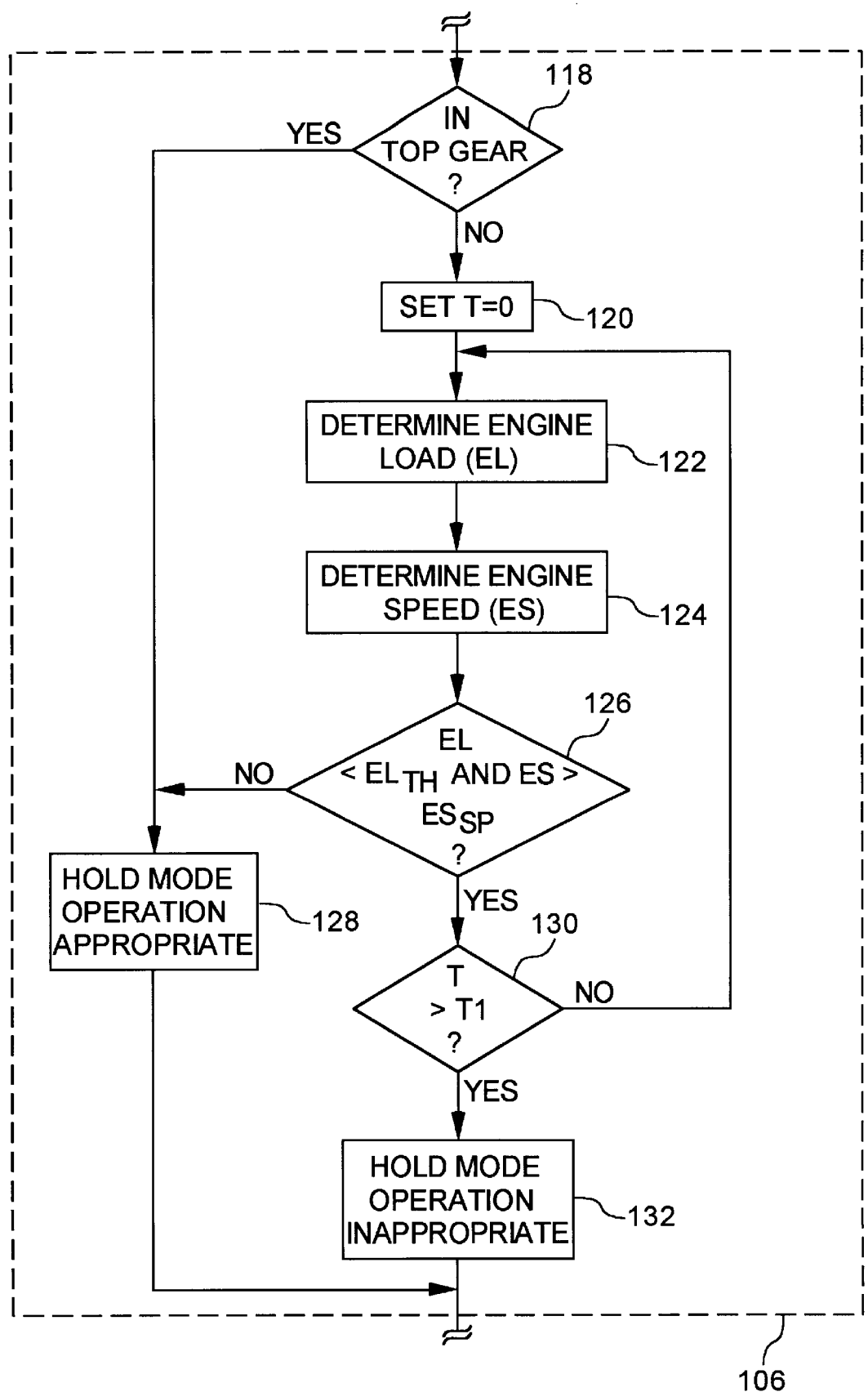
FIG. 4 is a flowchart illustrating one embodiment of a software routine, executable by the system of FIG. 1, for determining whether hold mode operation is proper for current operating conditions, in accordance with the present invention.

If, at step 104, control computer 55 determines that the hold mode of operation is currently selected, algorithm execution continues at step 106 where control computer 55 determines whether hold mode operation is inappropriate based on one or more current engine/vehicle operating conditions. In one embodiment, control computer 55 is operable to make a determination of whether hold mode operation is inappropriate based on the currently engaged gear ratio of transmission 16, current engine load conditions and current engine speed conditions, and one embodiment of step 106 for making such a determination is illustrated in FIG. 4. It is to be understood, however, that the present invention contemplates that control computer 55 may make a determination of whether hold mode operation is inappropriate based on any one or more of the foregoing engine/vehicle operating conditions as well as on one or more other engine/vehicle operating conditions that are monitored by control computer 55 and/or control computer 12, and that such alternative arrangements are intended to fall within the scope of the present invention.

Referring to FIG. 4, one preferred embodiment of step 106 of algorithm 100 begins at step 118 where control computer 55 is operable to determine whether the top gear (numerically highest of the automatically selectable gears) is currently engaged. In the embodiment illustrated in FIG. 4, control computer 55 is operable to make this determination by monitoring engine speed, provided thereto by control computer 12 via signal path 60, and vehicle speed, provided thereto by control computer 12 via signal path 60, and computing the currently engaged gear ratio as a function thereof as is known in the art. Alternatively, control computer 12 may make an identical determination and pass information relating to the currently engaged gear ratio to control computer 55 via signal path 60. Alternatively still, transmission control module 58 may include known means for determining a currently engaged gear ratio from the transmission 16 itself and provide information relating to the currently engaged gear ratio to control computer 55. In any case, if control computer 55 determines at step 118 that the top gear of transmission 16 is currently engaged, algorithm execution continues at step 128 where control computer 55 determines that hold mode operation is appropriate and continues therefrom at step 108 of FIG. 3. If, however, control computer 55 determines at step 118 that the top gear of transmission 16 is not currently engaged, algorithm execution continues at step 120.

At step 120, control computer 55 resets a time counter variable T to a starting value (e.g. zero), and algorithm execution continues therefrom at step 122 where control computer 55 is operable to determine a current engine load value EL. In one preferred embodiment, control computer 12 is operable to determine a current engine load value EL as a ratio of current engine fueling commands and maximum engine fueling commands and provide current engine load information to control computer 55 via signal path 60, as is known in the art, although the present invention contemplates determining the current engine load value EL in accordance with any known technique. In any case, algorithm execution continues from step 122 at step 124 where control computer 55 is operable to determine a current engine speed value ES, preferably by receiving current engine speed information from control computer 12 via signal path 60. Thereafter at step 126, control computer 55 is operable to compare the current engine load value EL with a predefined engine load threshold $EL_{TH}$ and compare the current engine speed value ES with a predefined engine speed threshold $ES_{SP}$. In one embodiment, $EL_{TH}$ and $ES_{SP}$ are programmable within memory 59 via the service/recalibration tool 56, and may include different $EL_{TH}$ and/or $ES_{SP}$ values for different gear ratios. Alternatively, only $EL_{TH}$ is programmable within memory 59 via tool 56, wherein memory 59 may contain different $EL_{TH}$ values for different gear ratios, and $ES_{SP}$ corresponds to predefined engine speed shift points preprogrammed within memory 59. Alternatively, $EL_{TH}$ and $ES_{SP}$ values may be programmed within memory 15 of control computer 12 via service/recalibration tool 62 and transferred to control computer 55 via signal path 60.

In any case, if the current engine load value EL is not below $EL_{TH}$ and the current engine speed value ES is not above $ES_{SP}$, algorithm execution continues at step 128 where control computer 55 determines that hold mode operation is appropriate. If, at step 126, control computer 55 determines that the current engine load value EL is below $EL_{TH}$ and the current engine speed value ES is above $ES_{SP}$, algorithm execution continues at step 130 where control computer 55 compares the time counter variable T to a predefined time value T1, wherein the value of T1 preferably resides within memory 59 and may or may not be a programmable parameter via service/recalibration tool 56. Alternatively, T1 may be stored within memory 15 and may or may not be a programmable parameter via tool 62, but in any case is transferred to control computer 55 via signal path 60. If, at step 130, control computer 55 determines that T is not above T1, algorithm execution loops back to step 122. If, however, control computer 55 determines at step 130 that T is above T1, algorithm execution continues at step 132 where control computer 55 determines that hold mode operation is inappropriate, and algorithm 100 advances to step 108.

In the embodiment of step 106 illustrated in FIG. 4, control computer 55 is thus operable to determine that hold mode operation is always appropriate if the top gear of transmission 16 is currently engaged. If, however, the top gear of transmission is not currently engaged, and engine load is below an engine load threshold and engine speed is above an engine speed threshold for a predefined time period, control computer 55 is operable to determine that hold mode operation is inappropriate. Alternatively, steps 120 and 130 may be omitted so that control computer 55 is operable to determine that hold mode operation is inappropriate if the top gear of transmission 16 is not currently engaged, and upon the immediate occurrence of the current engine load value being below the engine load threshold and the current engine speed value being above the engine speed threshold.

Returning to FIG. 3, algorithm execution continues from step 106 at step 108 where control computer 55 is operable to distinguish between whether the hold mode operation is appropriate or inappropriate. If hold mode operation is inappropriate, algorithm execution continues at step 110 where control computer 55 is operable to override hold mode operation. If, however, control computer 55 determines at step 108 that hold mode operation is appropriate, algorithm execution continues at step 112 where control computer 55 is operable to permit hold mode operation in the currently engaged gear ratio. Steps 110 and 112 continue at step 114 where algorithm execution is returned to its calling routine. Alternatively, steps 110 and 112 may continue at step 104 for continuous execution of algorithm 100.

Figure 5A:
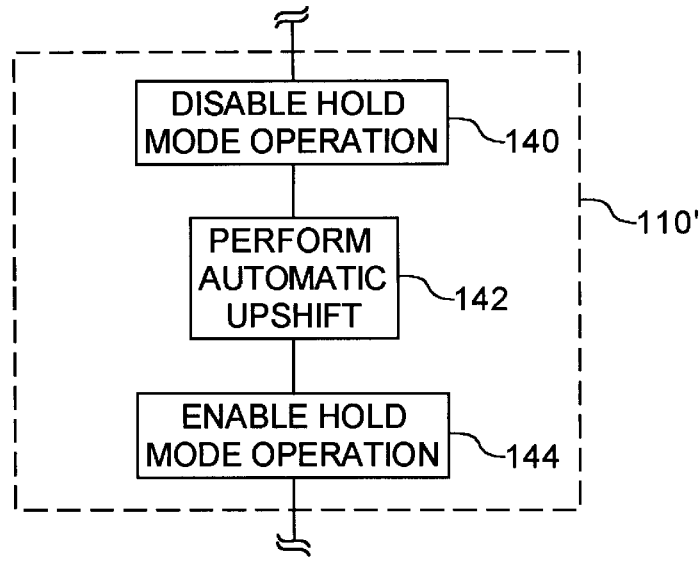
FIG. 5A is a flowchart illustrating one embodiment of a software routine, executable by the system of FIG. 1, for overriding hold mode operation, in accordance with the present invention.

Referring to FIG. 5A, one preferred embodiment 110' of step 110 of algorithm 100 for overriding hold mode operation is illustrated. Step 110' begins at step 140 where control computer 55 is operable to disable hold mode operation. Algorithm execution continues from step 140 at step 142 where control computer 55 is operable to initiate an automatic upshift to a numerically higher gear of transmission 16. Thereafter at step 144, control computer 55 is operable to enable hold mode operation in the newly engaged gear ratio of transmission 16. In this embodiment, control computer 55 is thus operable to initiate an automatic upshift of transmission 16 in response to a determination that hold mode operation is inappropriate in the previously engaged transmission gear.

Figure 5B:
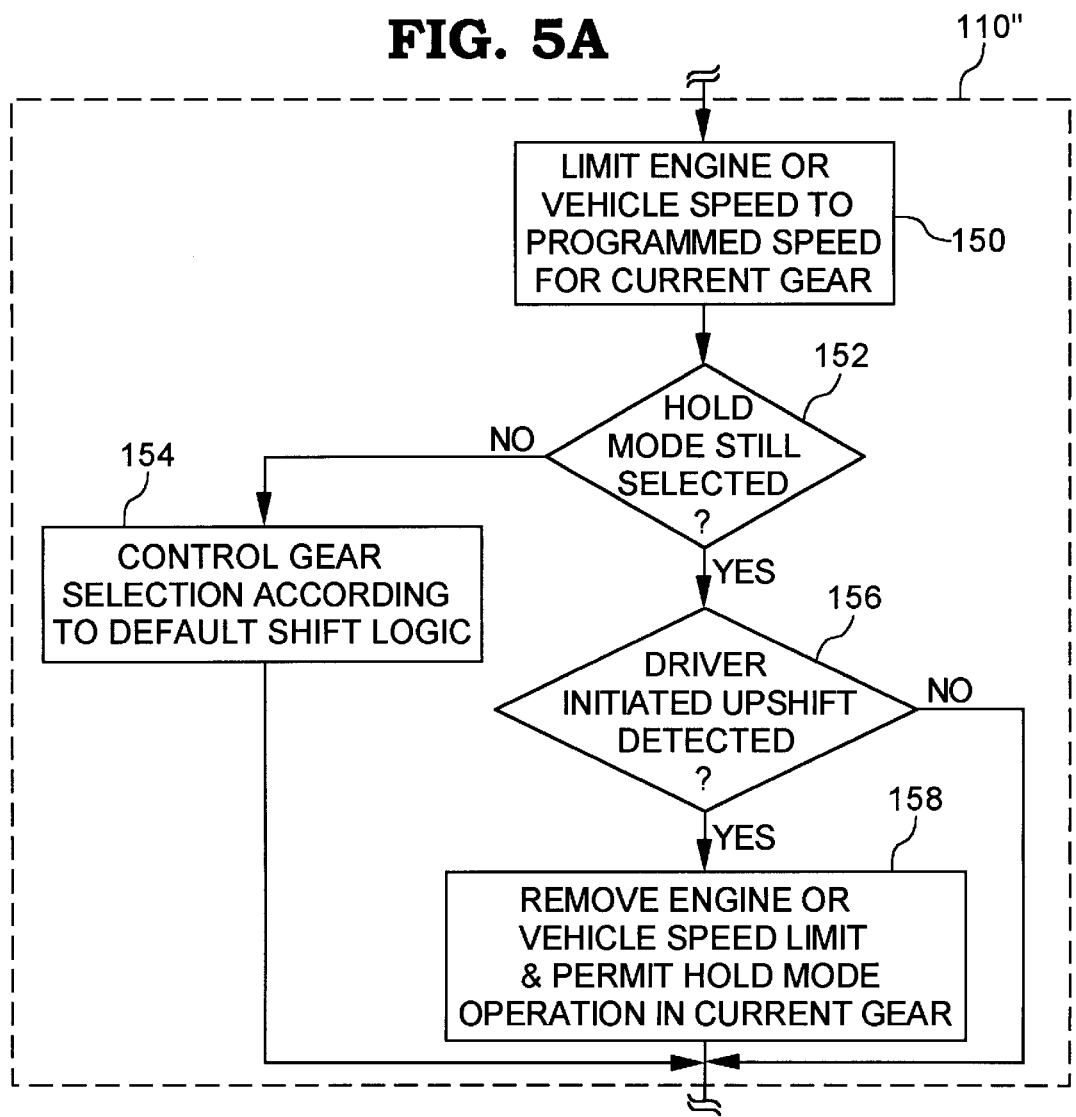
FIG. 5B is a flowchart illustrating an alternate embodiment of a software routine, executable by the system of FIG.

Referring to FIG. 5B, an alternate embodiment 110" of step 110 of algorithm 100 for overriding hold mode operation is illustrated. Step 110" begins at step 150 where control computer 55 is operable to limit engine or vehicle speed to a programmed speed, for the currently engaged gear ratio. In one embodiment, control computer 55 is operable to accomplish this step by issuing an engine or vehicle speed limit command to control computer 12 via signal path 60, and wherein control computer 12 is responsive to the engine or vehicle speed limit command to correspondingly limit engine or vehicle speed to a predefined engine or vehicle speed limit in accordance with known techniques. Preferably, control computer 12 is operable to limit engine or vehicle speed via an appropriately altered fueling command, although the present invention contemplates that control computer 12 may limit engine or vehicle speed in accordance with one or more other known techniques. In this embodiment, at least one programmed speed value is preferably stored within memory 59 or 15, the value of which is programmable via the service/recalibration tool 56 or 62 respectively. Preferably, memory 59 or 15 contains different programmed speeds for different gear ratios of transmission 16.

Execution of step 110" continues from step 150 at step 152 where control computer 55 is operable to determine whether hold mode operation is still selected, preferably in accordance with any of the techniques described with respect to step 104 of FIG. 3. If control computer 55 determines that hold mode operation is no longer selected at step 152, algorithm execution continues at step 154 where control computer 55 is operable to control automatic gear selection according to the preexisting, or default, engine speed shift point control logic stored within memory 59. Algorithm execution continues from step 154 at step 114 (FIG. 3).

If, on the other hand, control computer 55 determines at step 152 that hold mode operation remains selected, algorithm execution continues at step 156 where control computer 55 is operable to determine whether an operator initiated upshift to a numerically higher transmission gear has occurred. Preferably, control computer 55 is operable to execute step 156 by monitoring the status of upshift selector 48 (FIG. 1), and if the vehicle operator actuates upshift selector 48 while hold mode operation is active, control computer 55 is operable to detect an operator initiated upshift. If a driver initiated upshift is not detected at step 156, algorithm execution continues at step 114 (FIG. 3). If, however, control computer 55 determines that a driver initiated upshift has occurred at step 156, algorithm execution continues at step 158 where control computer 55 is operable to remove the engine or vehicle speed limit control and permit hold mode operation in the newly selected transmission gear. Algorithm execution continues from step 158 at step 114 (FIG. 3).

In the embodiment illustrated in FIG. 5B, control computer 55 is operable to override inappropriate usage of hold mode operation by limiting engine or vehicle speed to a programmable speed based on the currently engaged gear ratio and thereafter monitor hold mode status. If the vehicle operator responds to the computer-limited engine or vehicle speed by de-selecting hold mode operation (i.e. moving gear shift lever out of the H position or equivalent operator action in an embodiment of console 42 not having a selectable H position), control computer 55 is operable to initiate gear selection based on the pre-programmed engine speed shift point control logic that is typically resident within memory 59. If, however, the vehicle operator responds to the computer-limited engine or vehicle speed by initiating a manual upshift to a numerically higher transmission gear while maintaining selection of hold mode operation (such as via upshift selector 48 or equivalent structure), control computer 55 is operable to remove the engine or vehicle speed limit and permit hold mode operation in the newly selected transmission gear. In this manner, the vehicle operator is provided with a performance incentive for operating the engine/vehicle in hold mode only when it is appropriate to do so.

While the invention has been illustrated and described in detail in the foregoing drawings and description, the same is to be considered as illustrative and not restrictive in character, it being understood that only the preferred embodiment has been shown and described and that all changes and modifications that come within the spirit of the invention are desired to be protected.

What is claimed is:

1. System for overriding hold mode operation of an automated transmission, comprising:

an automated transmission coupled to an internal combustion engine, said transmission having a selectable hold mode of operation maintaining engagement of a currently engaged transmission gear;

means for determining at least one vehicle operating parameter and producing a vehicle operating parameter signal corresponding thereto; and a control computer responsive to said vehicle operating parameter signal if said hold mode of operation is selected to determine whether said hold mode of operation is inappropriate, said control computer initiating an automatic upshift to a numerically higher transmission gear if said hold mode of operation is inappropriate;

wherein said means for determining at least one vehicle operating parameter includes means for determining engine load and producing an engine load signal corresponding thereto;

and wherein said control computer is operable to determine whether said hold mode of operation is inappropriate as a function of said engine load signal.

2. The system of claim 1 wherein said means for determining at least one vehicle operating parameter includes means for sensing one of engine and vehicle speed and producing a speed signal corresponding thereto;

and wherein said control computer is operable to further determine whether said hold mode of operation is inappropriate as a function of said speed signal.

3. The system of claim 2 wherein said means for determining at least one vehicle operating parameter includes means for determining said currently engaged gear ratio;

and wherein said control computer is operable to further determine whether said hold mode of operation is inappropriate as a function of said currently engaged gear ratio.

4. The system of claim 3 wherein said control computer is operable to determine that said hold mode of operation is inappropriate if said currently engaged gear ratio is not a top gear of said transmission, said engine load signal is below a predefined engine load threshold and said speed signal is above a predefined speed threshold.

5. The system of claim 4 wherein said control computer is operable to determine that said hold mode of operation is inappropriate if said currently engaged gear ratio is not a top gear of said transmission, said engine load signal is below said predefined engine load threshold and said speed signal is above said predefined speed threshold for at least a predefined time period.

6. The system of claim 5 wherein said control computer is a transmission control computer associated with said automated transmission.

7. The system of claim 5 further including a memory having said engine load threshold and said predefined time period stored therein.

8. The system of claim 7 further including means for programming said control computer;

and wherein said engine load threshold and said predefined time period are programmable in said memory via said means for programming said computer.

9. The system of claim 8 wherein said control computer is an engine control computer operable to control and manage operation of said internal combustion engine;

and further including:
a transmission control computer associated with said automated transmission, said transmission control computer operable to determine said speed threshold as a function of said currently engaged gear ration of said transmission, said transmission control computer in communication with said engine control computer and providing said speed threshold thereto.

10. The system of claim 8 wherein said memory includes said speed threshold stored therein;

and wherein said speed threshold is programmable in said memory via said means for programming said computer.

11. The system of claim 10 wherein said control computer is an engine control computer operable to control and manage operation of said internal combustion engine.

12. System for overriding hold mode operation of an automated transmission, comprising:

an automated transmission coupled to an internal combustion engine, said transmission having a selectable hold mode of operation maintaining engagement of a currently engaged transmission gear;

means for determining at least one vehicle operating parameter and producing a vehicle operating parameter signal corresponding thereto; and a control computer responsive to said vehicle operating parameter signal if said hold mode of operation is selected to determine whether said hold mode of operation is inappropriate, said control computer initiating an automatic upshift to a numerically higher transmission gear if said hold mode of operation is inappropriate;

wherein said means for determining at least one vehicle operating parameter includes means for determining said currently engaged gear ratio;

and wherein said control computer is operable to determine that said hold mode of operation is appropriate is said means for determining said currently engaged gear ration determine that said currently engaged gear ratio is a top gear of said transmission.

13. A method of overriding hold mode operation of an automated transmission coupled to an internal combustion engine wherein the automated transmission has a hold mode of operation maintaining engagement of a currently engaged gear ration, the method comprising the steps of:

determining whether said hold mode of operation is selected;

determining at least one vehicle operating parameter, said at least one vehicle parameter including engine load;

determining whether said hold mode of operation is inappropriate, if said hold mode of operation is selected, based on said at least one vehicle operating parameter; and initiating an automatic upshift to a numerically higher transmission gear if said hold mode of operation is inappropriate.

14. The method of claim 13 wherein said at least one vehicle operating parameter includes one of engine speed and vehicle speed.

15. The method of claim 14 wherein said at least one vehicle operating parameter includes said currently engaged transmission gear ratio.

16. The method of claim 15 wherein said step of determining whether said hold mode of operation is inappropriate includes the steps of:

comparing said one of engine speed and vehicle speed to a predefined speed value;

comparing said engine load to a predefined engine load value; and determining that said hold mode of operation is inappropriate if said currently engaged transmission gear ratio is not a top gear of said transmission, said engine load is below said predefined engine load value and said one of engine speed and vehicle speed is above said predefined speed value.

17. The method of claim 16 wherein said step of determining that said hold mode of operation is inappropriate includes determining that said currently engaged transmission gear ratio is not a top gear of said transmission, said engine load is below said predefined engine load value and said one of engine speed and vehicle speed is above said predefined speed value for at least a predefined time period.

18. System for overriding hold mode operation of an automated transmission, comprising:
   an automated transmission coupled to an internal combustion engine, said transmission having a selectable hold mode of operation maintaining engagement of a currently engaged transmission gear;
   means for determining at least one vehicle operating parameter and producing a vehicle operating parameter signal corresponding thereto; and
   a control computer responsive to said vehicle operating parameter signal if said hold mode of operation is selected to determine whether said hold mode of operation is inappropriate, said control computer limiting one of engine and vehicle speed to a predefined speed value if said hold mode of operation is inappropriate.

19. The system of claim 18 wherein said means for determining at least one vehicle operating parameter includes means for determining said currently engaged gear ratio;
   and wherein said control computer is operable to determine that said hold mode of operation is appropriate if said means for determining said currently engaged gear ration determines that said currently engaged gear ratio is a top gear of said transmission.

20. The system of claim 18 wherein said means for determining at least one vehicle operating parameter includes means for sensing one of engine and vehicle speed and producing a speed signal corresponding thereto;
   and wherein said control computer is operable to determine whether said hold mode of operation is inappropriate as a function of said speed signal.

21. The system of claim 20 wherein said means for determining at least one vehicle operating parameter includes means for determining engine load and producing an engine load signal corresponding thereto;
   and wherein said control computer is operable to further determine whether said hold mode of operation is inappropriate as a function of said engine load signal.

22. The system of claim 21 wherein said means for determining at least one vehicle operating parameter includes means for determining said currently engaged gear ratio;
   and wherein said control computer is operable to further determine whether said hold mode of operation is inappropriate as a function of said currently engaged gear ratio.

23. The system of claim 22 wherein said control computer is operable to determine that said hold mode of operation is inappropriate if said currently engaged gear ratio is not a top gear of said transmission, said engine load signal is below a predefined engine load threshold and said speed signal is above a predefined speed threshold.

24. The system of claim 23 further including:
   means for selecting and deselecting said hold mode operation; and
   means for manually initiating an upshift to a numerically higher transmission gear if said hold mode of operation is selected;
   and wherein said control computer is operable to remove said limit of said predefined speed value upon detection of manually initiated upshift in said hold mode of operation.

25. The system of claim 24 wherein said control computer is further responsive to said currently engaged gear ration of said transmission, said speed signal and said engine load signal if said hold mode of operation remains selected after engagement of a numerically higher transmission gear pursuant to said manually initiated upshift to determine whether said hold mode of operation is still inappropriate, said control computer limiting one of engine and vehicle speed to another predefined speed value if said hold mode of operation is still inappropriate.

26. The system of claim 23 wherein said control computer is operable to determine that said hold mode of operation is inappropriate if said currently engaged gear ratio is not a top gear of said transmission, said engine load signal is below said predefined engine load threshold and said speed signal is above said predefined speed threshold for at least a predefined time period.

27. The system of claim 26 wherein said control computer is a transmission control computer associated with said automated transmission.

28. The system of claim 26 further including a memory having said engine load threshold and said predefined time period stored therein.

29. The system of claim 28 further including means for programming said control computer;
   and wherein said engine load threshold and said predefined time period ate programmable in said memory via said means for programming said computer.

30. The system of claim 29 wherein said control computer is an engine control computer operable to control and manage operation of said internal combustion engine;
   and further including:
      a transmission control computer associated with said automated transmission, said transmission control computer operable to determine said speed threshold as a function of said currently engaged gear ration of said transmission, said transmission control computer in communication with said engine control computer and providing said speed threshold thereto.

31. The system of claim 29 wherein said memory includes said speed threshold stored therein;
   and wherein said speed threshold is programmable in said memory via said means for programming said computer.

32. The system of claim 31 wherein said control computer is an engine control computer operable to control and manage operation of said internal combustion engine.

33. A method of overriding hold mode operation of an automated transmission coupled to an internal combustion engine wherein the automated transmission has a hold mode of operation maintaining engagement of a currently engaged gear ratio, the method comprising the steps of:
   determining whether said hold mode of operation is selected;
   determining at least one vehicle operating parameter;
   determining whether said hold mode of operation is appropriate if said hold mode of operation is selected based on said at least one vehicle operating parameter; and
   limiting one of engine and vehicle speed to a predefined speed value if said hold mode of operation is inappropriate.

34. The method of claim 33 further including the steps of:
   determining whether a manual upshift to a numerically higher transmission gear has been initiated;
   determining whether said hold mode of operation is still selected after execution of said manual upshift; and removing said limit of said one of engine speed and vehicle speed if said hold mode of operation is still selected after execution of said manual upshift.

35. The method of claim 34 further including the steps of:

determining a current value of said at least one vehicle operating parameter;

determining whether said hold mode of operation is still inappropriate, if said hold mode of operation is still selected after execution of said manual upshift, based on said current value of said at least one vehicle operating parameter; and limiting one engine and vehicle speed to another predefined speed value if said hold mode of operation is still inappropriate.

36. The method of claim 33 wherein said at least one vehicle operating parameter includes one of engine speed and vehicle speed.

37. The method of claim 36 wherein said at least one vehicle operating parameter includes engine load.

38. The method of claim 37 wherein said at least one vehicle operating parameter includes said currently engaged transmission gear ratio.

39. The method of claim 38 wherein said step of determining whether said hold mode of operation is inappropriate includes the steps of:

comparing said one of engine speed and vehicle speed to a predefined speed value;

comparing said engine load to a predefined engine load value; and determining that said hold mode of operation is inappropriate if said currently engaged transmission gear ratio is not a top gear of said transmission, said engine load is below said predefined engine load value and said one of engine speed and vehicle speed is above said predefined speed value.

40. The method of claim 39 wherein said step of determining that said hold mode of operation is inappropriate includes determining that said currently engaged transmission gear ratio is not a top gear of said transmission, said engine load is below said predefined engine load value and said one of engine speed and vehicle speed is above said predefined speed value for at least a predefined time period.

41. System for overriding hold mode operation of an automated transmission, comprising:

an automated transmission coupled to an internal combustion engine, said transmission having a selectable hold mode of operation maintaining engagement of a currently engaged transmission gear;

means for determining at least one vehicle operating parameter and producing a vehicle operating parameter signal corresponding thereto; and a control computer responsive to said vehicle operating parameter signal if said hold mode of operation is selected to determine whether said hold mode of operation is inappropriate, and if said hold mode of operation is inappropriate, said control computer limiting one of engine and vehicle speed to a predefined speed value or alternatively initiating an automatic upshift to a numerically higher transmission gear.

42. The system of claim 41 wherein said means for determining at least one vehicle operating parameter includes means for sensing one of engine and vehicle speed and producing a speed signal corresponding thereto;

and wherein said control computer is operable to determine whether said hold mode of operation is inappropriate as a function of said speed signal.

43. The system of claim 42 wherein said means for determining at least one vehicle operating parameter includes means for determining engine load and producing an engine load signal corresponding thereto;

and wherein said control computer is operable to further determine whether said hold mode of operation is inappropriate as a function of said engine load signal.

44. The system of claim 43 wherein said means for determining at least one vehicle operating parameter includes means for determining said currently engaged gear ratio;

and wherein said control computer is operable to further determine whether said hold mode of operation is inappropriate as a function of said currently engaged gear ratio.

45. The system of claim 44 wherein said control computer is operable to determine that said hold mode of operation is inappropriate if said currently engaged gear ratio is not a top gear of said transmission, said engine load signal is below a predefined engine load threshold and said speed signal is above a predefined speed threshold.

* * * * *

UNITED STATES PATENT AND TRADEMARK OFFICE
CERTIFICATE OF CORRECTION

PATENT NO. : 6,030,315
DATED : February 29, 2000
INVENTOR(S) : Steven M. Bellinger It is certified that error appears in the above-identified patent and that said Letters Patent is hereby corrected as shown below:

Col. 12, line 23
  replace "is"
  with --if--
Col. 12, line 31
  replace "ration"
  with --ratio--
Col. 14, line 2
  replace "ration"
  with --ratio--
Col. 14, line 27
  replace "ate"
  with --are--

Signed and Sealed this

Sixth Day of February, 2001

*Attest:*

Q. TODD DICKINSON

*Attesting Officer*            *Director of Patents and Trademarks*

UNITED STATES PATENT AND TRADEMARK OFFICE
CERTIFICATE OF CORRECTION

PATENT NO. : 6,030,315
DATED : February 29, 2000
INVENTOR(S) : Steven M. Bellinger Page 1 of 1

It is certified that error appears in the above-identified patent and that said Letters Patent is hereby corrected as shown below:

<u>Title page,</u>
After Assignee, Item [73] should read as follows:

Please replace "Cumiins" with -- Cummins --
Please replace "Ohio" with -- Indiana --

Signed and Sealed this

Ninth Day of October, 2001

*Attest:*

NICHOLAS P. GODICI
*Attesting Officer*    *Acting Director of the United States Patent and Trademark Office*